United States Patent [19]

Jones

[11] Patent Number: 4,907,958

[45] Date of Patent: Mar. 13, 1990

[54] APPARATUS FOR FLANGING TUBULAR POLYMER ARTICLES

[75] Inventor: Mark I. Jones, Sussex, England

[73] Assignee: CMB Packaging (UK) Limited, Worcester, Great Britain

[21] Appl. No.: 199,734

[22] Filed: May 27, 1988

[30] Foreign Application Priority Data

May 27, 1987 [GB] United Kingdom ............. 8712407

[51] Int. Cl.4 .............................................. B29C 57/02
[52] U.S. Cl. ................................... 425/384; 264/322; 425/393; 425/DIG. 218
[58] Field of Search ..... 425/392, 393, 384, DIG. 218; 264/322

[56] References Cited

U.S. PATENT DOCUMENTS

| | | | |
|---|---|---|---|
| 2,823,418 | 2/1958 | Fritts | 425/392 X |
| 3,359,599 | 12/1967 | Martin et al. | 425/392 X |
| 4,008,028 | 2/1977 | Ronden et al. | 425/393 X |
| 4,021,286 | 5/1977 | Amberg | 425/393 X |
| 4,308,225 | 12/1981 | Magarian | 425/392 X |
| 4,379,115 | 4/1983 | Seach et al. | 425/393 X |
| 4,559,197 | 12/1985 | Dick et al. | 425/392 X |
| 4,643,658 | 2/1987 | Gordon | 425/393 X |

FOREIGN PATENT DOCUMENTS 2143461 2/1985 United Kingdom .

OTHER PUBLICATIONS

*Reference checked was cited by applicant on p. 1 of specification.

*Primary Examiner*—Richard L. Chiesa
*Attorney, Agent, or Firm*—Diller, Ramik & Wight

[57] ABSTRACT

An apparatus for flanging tubular articles of a thermoplastic polymer which has been drawn and heat-set to an elevated temperature comprises a heating die (20) shaped to receive an end of one of the tubular articles (10) and to restrain it from shrinkage, transfer means such as a star wheel (24) to transfer the article (10) from the heating die (20) to a forming die (22) shaped to form an outward flange (12) on said end. Heater coils (33,40) are provided to maintain the dies at the required temperatures; namely the heating die (20) at a softening temperature above the glass transition temperature of the polymer but below the elevated temperature to which it has been heat-set and the forming die (22) at a forming temperature below the softening temperature. Means, such as a pneumatic system (48,50,52) are provided to apply an end of one of the tubular articles (10) to the heating die (20) so that this end is softened whilst restrained from residual shrinkage by the heating die (20) and also for forcing the forming die (22) and the heat-softened end of the tubular article (10) together to form the outward flange (12). Once the flange (12) has been formed, it is cooled e.g. by cooling air whilst restrained against deformation by the forming die (22) to set the flange in accordance with well-defined dimensions.

14 Claims, 7 Drawing Sheets

APPARATUS FOR FLANGING TUBULAR POLYMER ARTICLES

BACKGROUND TO THE INVENTION

1. Field of the Invention

This invention relates to methods and apparatus for flanging tubular polymer articles, and more specifically to the flanging of the open ends of tubular articles of thermoplastic polymers, particularly of saturated linear polyester materials such as polyethylene terephthalate. The tubular articles may be open at both ends or may have one open end and one closed end (integral or otherwise). The tubular articles may be of circular, rectangular or other cross-section.

2. Description of Related Art

Our published British Patent Application No. 8319768 (publication No. 2143461A) discloses and claims a method of flanging a tubular article of a crystallisable thermoplastic polymer which has been drawn and heat-set to an elevated temperature, leaving the material with a residual shrinkage capability, comprising the steps of: applying an end of the tubular article to a flanging die which engages the inner surface of the end, heating the said end of the tubular article to a flanging temperature, at which the said crystallisable thermoplastic polymer is softened, the flanging temperature being above the glass transition temperature of the polymer but below the elevated temperature to which it has been heat-set, forcing the tubular article and the die together, so that the heat-softened end of the tubular article is forced by the die to move outwards to form a flange, the material of which undergoes residual shrinkage to establish well-defined flange dimensions as the polymer takes up the contours of the die, and then causing the flanged end of the tubular article to cool whilst restrained against deformation to set the flange in accordance with said well-defined dimensions.

That patent application also discloses and claims apparatus for flanging tubular articles of a crystallisable thermoplastic polymer which has been drawn and heat-set to an elevated temperature, comprising: a pair of flanging dies, arranged to engage opposite ends of one of the tubular articles for forming an outward flange simultaneously at both ends of the tubular article, means for forcing the dies towards each other, and means for heating and means for cooling the said ends of the tubular article.

In the specific examples described in Application No. 8319768, the heating and cooling of the flanged end are both effected while it is in contact with the flanging die. This requires the flanging die to be heated to the flanging temperature and then to be cooled to a temperature which in practice is at least 20° C. (typically 40° C.) below the flanging temperature to set the flange. Such thermal cycling is inefficient, wasteful of energy and time consuming.

SUMMARY

An object of the present invention is to provide a method and apparatus by which a well-defined flange can be reliably formed upon the end of a tubular article of a thermoplastic polymer without the need to thermally cycle a flanging die.

According to the present invention, there is provided a method of flanging a tubular article of a thermoplastic polymer which has been drawn and heat-set to an elevated temperature, comprising the steps of:

(a) applying an end of the tubular article to a heating die, which is maintained at a temperature at which the thermoplastic polymer is softened, said softening temperature being above the glass transition temperature of the polymer but below the elevated temperature to which it has been heat-set, so that the said end of the tubular article is softened, but is restrained from residual shrinkage by the heating die;

(b) transferring the tubular article to a forming die which is held at a forming temperature, below the said softening temperature;

(c) forcing the tubular article and the forming die together so that the heat-softened end of the tubular article is forced by the forming die to move outwards to form a flange; and (d) causing the flanged end of the tubular article to cool whilst restrained against deformation by the forming die to set the flange in accordance with well-defined dimensions.

The invention also resides in apparatus for flanging tubular articles of a thermoplastic polymer which has been drawn and heat-set to an elevated temperature comprising:

(a) a heating die shaped to receive an end of one of the tubular articles and to restrain said end from shrinkage, (b) means for maintaining the heating die at a temperature at which the thermoplastic polymer is softened, said softening temperature being above the glass transition temperature of the polymer but below the elevated temperature to which it has been heat-set, (c) means for applying an end of one of the tubular articles to the heating die so that said end is softened whilst restrained from residual shrinkage by the heating die;

(d) a forming die shaped to form an outward flange on said end of the tubular article, (e) means for holding the forming die at a forming temperature below the softening temperature;

(f) means for transferring the tubular article from the heating die to the forming die;

(g) means for forcing the forming die and the heat-softened end of the tubular article together to form said outward flange;

(h) means for cooling the flanged end of the tubular article whilst said flange is being set in accordance with well-defined dimensions, said means being located externally of the tubular article.

This means for cooling the flanged end preferably comprises means for directing cooling air to the flange.

The heating die preferably comprises a heated metal body with an annular recess dimensioned to receive the end of the tubular article. In one preferred form, the forming die comprises a heated metal body with a boss running into an outwardly directed flange for forming the outward flange on the tubular article.

The means for transferring the tubular article from the heating die to the forming die may comprise a rotary member having a gripping means for gripping the tubular article, and indexing means for rotating the rotary member between positions in which it presents the tubular article to the heating die and to the forming die, respectively.

The gripping means may comprise a bore in the rotary member and means for applying suction to the bore.

In a preferred embodiment the heating die and the forming die are mounted on a common support member movable in a direction parallel to the axes of the dies, and the means for applying an end of the tubular article to the heating die and the means for forcing the forming die and the heat-softened end of the tubular article together are constituted by a fluid pressure actuator arranged to move the support member in said direction.

The apparatus may be adapted to flange both ends of a tubular article simultaneously, in which case pairs of opposed heating dies and forming dies may be disposed on opposed supporting members each of which has a fluid pressure actuator to move it towards and away from the opposite support member.

In a modification, the forming die comprises a heated metal boss surrounded by a ring which co-operates with the boss to provide a flange forming recess and the boss and the ring are supported to allow limited relative axial movement between them such that on retraction of the forming die relative axial movement between the boss and the ring causes the ring to eject the flanged end of the tubular article from the forming die.

DESCRIPTION OF THE PREFERRED EMBODIMENTS

Figure 1:
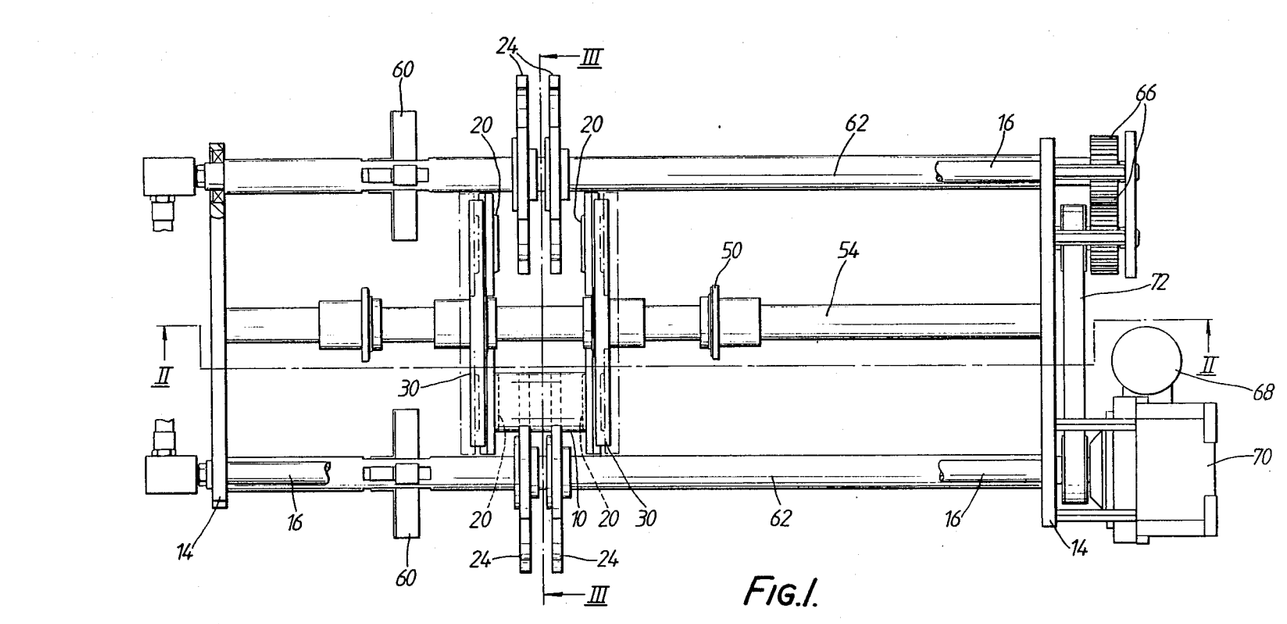
FIG. 1 illustrates in plan view an apparatus for flanging tubular polymer articles in accordance with the invention.
Figure 2:
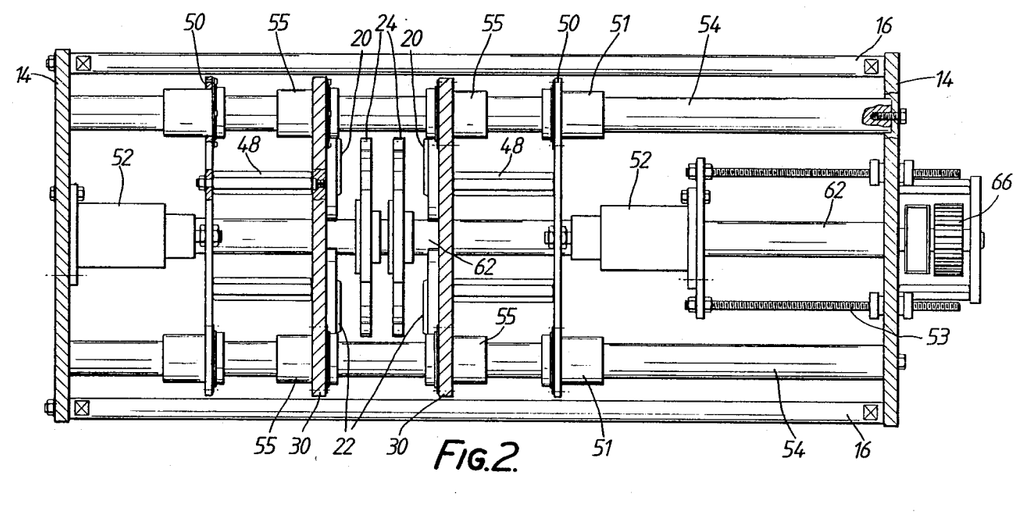
FIG. 2 is a section along the line II—II in FIG. 1.
Figure 3:
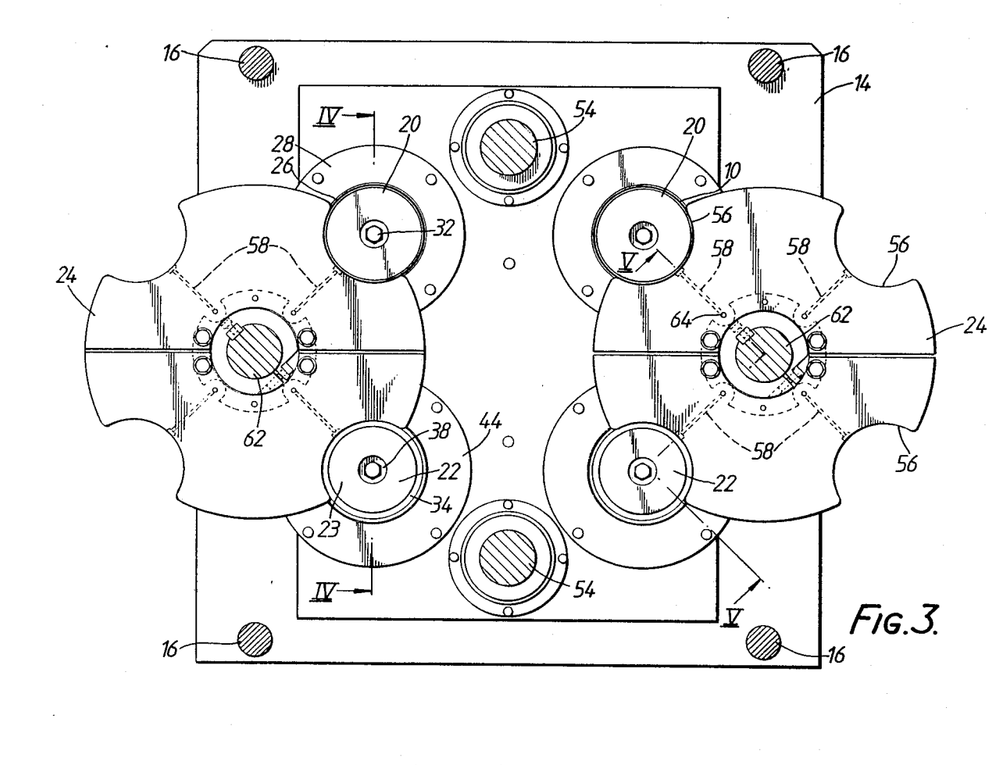
FIG. 3 is a part-sectional view, to a larger scale, on the line III—III in FIG. 1.

As shown in FIGS. 1, 2 and 3, the apparatus is supported by a framework comprising two end plates 14 between which run four tie rods 16 and two guide bars 54 (two shown in FIG. 2, only one visible in FIG. 1). Two rotary shafts 62 (two shown in FIG. 1, only one visible in FIG. 2), are journalled in the end plates 14. The apparatus further comprises two opposed pairs of heating dies 20, 20 (FIG. 1) disposed immediately above two corresponding pairs of opposed forming dies 22, 22 (FIGS. 2 and 3). The arrangement of dies opposite one another enables both ends of a container body 10 (FIG. 1) to be flanged simultaneously. Two star wheels 24, 24 mounted on the shafts 62 are used to transfer the container body 10 from the heating dies 20, 20 to the forming dies 22, 22. The opposed heating and forming dies are mounted on respective support plates 30 movable towards and away from one another on the guide bars 54 to allow the transfer to take place.

Figure 4:
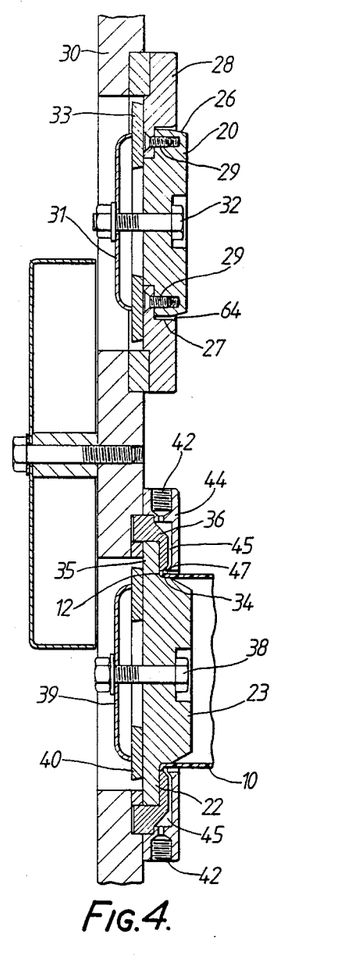
FIG. 4 is a section, to a larger scale again, on the line IV—IV in FIG. 3.
Figure 5:
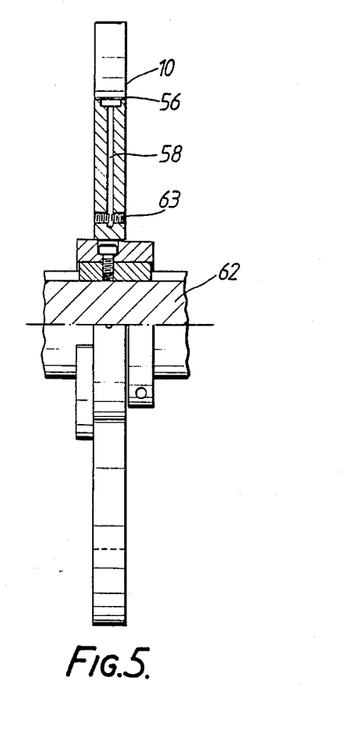
FIG. 5 is a part-sectional view, to a yet larger scale, on the line V—V in FIG. 3.

FIG. 4 shows a heating die 20 and a forming die 22 in greater detail. The heating die 20 has a chamfered wall 26 and is surrounded by a ring 28 whose inner periphery is spaced from the wall 26 to form a restraining recess 27 whose width is only slightly greater than the thickness of the wall of the container body 10. The ring 28 is secured to the heating die 20 by screws 29. A ring-shaped heater coil 33 is secured to the heating die 20 by a bolt 32 and clamping plate 31 and is used to maintain the heating die 20 at a constant softening temperature above the glass transition temperature of the thermoplastic polymer of which the container body 10 is made but below its heat-set temperature. The softening temperature is typically 140° C. for polyethylene terephthalate.

The forming die 22 has a boss 23 with a chamfered wall 34 running into an outward flange 35 and is surrounded by a stop ring 36 whose inner periphery is spaced from the wall 34 to form a forming recess whose width is equal to the desired width of a flange 12 to be produced. The depth of the forming recess around the forming die 22 is less than the depth of the restraining recess 27 on the heating die 20. The stop ring 36 and the forming die 22 are both mounted on the same support plate 30 as the heating die 20. A ring shaped heater coil 40 is also secured to the forming die 22 by a bolt 38 and clamping plate 39 and is used to maintain the forming die 22 at a constant forming temperature below the softening temperature. The forming temperature is typically 80° C. for polyethylene terephthalate. An annular housing 44 adjacent the stop ring 36 is provided with cold air inlets 42 and defines with the stop ring a cold air passage 45 with an annular outlet 47 directed at the junction of the wall 34 and the flange 35.

As shown in FIG. 3, on the support plate 30 are mounted two heating dies 20 and two forming dies 22, this being a convenient arrangement.

As shown in FIGS. 1 and 2, two such support plates 30 are arranged opposite and parallel to each other with the dies facing each other. Each support plate 30 is movable towards and away from the other by means of a pneumatic ram 52 acting on a cross-head 50, which is guided by sleeves 51 on the guide bars 54 and is connected by bars 48 to the support plate 30. The two guide bars 54 on which the support plates 30 are mounted through sleeves 55, ensure that the movement of the dies 20, 22 is parallel to the axes of the dies. The bars 48, the cross-heads 50 and the rams 52 together form what is hereinafter referred to as the "pneumatic system" of the apparatus.

One of the rams 52 in the pneumatic system (the left-hand one in FIG. 2) is mounted directly on the adjacent end plate 14, while the other is mounted on its adjacent end plate 14 through screw-threaded rods 53. These rods are adjustable in length thus enabling the apparatus to accomodate different lengths of container body.

Two star wheels 24 are used to hold container bodies 10 in position for application to the heating die 20 and forming die 22 and also to transfer container bodies 10 from the heating die 20 to the forming die 22. The star wheels 24 are rotated with an indexing motion by rotary shafts 62 driven by a motor 68, the index movement being controlled by a gear box 70. One rotary shaft 62 is driven directly from the gear box 70; the rotational motion is transferred to the other rotary shaft 62 by means of a belt 72 and a pair of gears 66 which reverse the sense of rotation.

As shown in FIG. 3, each star wheel 24 has four cut-outs 56 spaced evenly around its outer circumference. The separation of the cut-outs is such that a first container body 10 can be held in position for application to the heating die 20 while a second container body 10 is held in position for application to the forming die 22.

Radial bores 58 are provided in each star wheel 24, terminating in the base of each cut-out 56 and communicating through a cross-bore 63 with a source of suction (not shown) for holding container bodies 10 in the cut-outs. The suction is produced from a compressed air supply (not shown) via a venturi arrangement 60 (FIG. 1) in the rotary shaft 62. The suction is produced in the bore 58 via distributor pipes (not shown) leading from the venturi arrangement 60.

In use, a container body 10 is picked up in a cut-out 56 of the star wheel 24 and held therein by suction from the bore 58. The container body 10 is moved into position between the two heating dies 20 opposite one another, the support plates 30 on which the heating dies 20 are mounted being in the retracted position shown in dotted lines on FIG. 1. The heating dies 20 are then applied to the open ends of the container body 10 by moving the support plates 30 to the compressed position shown in continuous lines in FIG. 1 by means of the pneumatic system 48,50,52. The location of the open end of the container body in the restraining recess 27 between the wall 26 of the heating die 20 and the ring 28 is assisted by the chamfer on the wall 26 and by a lead-in taper 64 on the ring 28.

The ends of the container body 10 are heat-softened by conduction of heat from the heating die 20. The wall 26 of the heating die 20 substantially prevents the ends of the container body 10 from being deformed by shrinkage during this softening process.

The support plates 30 are then moved back to the retracted position releasing the ends of the container body 10 from the heating dies 20. The star wheel 24 is indexed so that the container body 10 is placed in position between the two forming dies 22 opposite one another. The forming dies 22 are then forced towards one another by means of the support plates 30 and the pneumatic system 48,50,52. The ends of the container body 10 are guided by the chamfer on the wall 34 into the ring 36. As mentioned previously, the forming dies 22 are maintained at a constant temperature, typically 80° C., sufficiently high to keep the ends of the container body 10 in a formable condition. The ends of the container body 10 are thereby forced by the ram pressure to move outwards to form the flange 12 until the end of the flange 12 abuts against the stop ring 36.

The flange 12 is then cooled by cooling air introduced through the cold air inlets 42 and the annular passage 45. The cooling air is taken from the compressed air supply used to produce suction in the star wheels 24. This cooling sets the flange to the required well-defined dimensions. The flange 12 itself acts to thermally insulate the forming die 22 from the cooling air. The support plates 30 are then moved back to the retracted position releasing the ends of the container body 10 from the forming dies 22. The star wheel 24 is indexed so that the container body 10 is removed from between the support plates 30. The suction is cut off and the container body 10 is released from the star wheel 24.

It will be recognised that the arrangement of the apparatus described is particularly applicable to use in an automated continuous production line. The four evenly-spaced cut-outs 56 on each star wheel 24 enable a first container body 10 to be picked up from a feeding mechanism, a second container body to be heat-softened by the heating dies 20, a third container body to have a flange formed between the forming dies 22 and a fourth container body to be set down on to a conveyor for removal. The mounting of the heating die 20 and the forming die 22 on the same support plate 30 so that these dies 20, 22 can be applied simultaneously to container bodies 10 is also advantageous to such an application, though it will be recognised that this mounting is a preferred embodiment rather than a necessary part of the invention. It should be noted that the restraining recess 27 is deeper than the forming recess so that no compressive load is applied to containers being heat-softened when a compressive load is applied to a container to be flanged by forming dies 22.

The method and apparatus described specifically above may be modified within the ambit of the invention. In particular, for containers with a single open end, one of each pair of heating dies 20 and forming die 22 may be replaced by a pair of flat or shaped abutments to bear against the closed end of the container when the plates 30 are moved towards one another.

In a modification of the described apparatus, the pneumatic system 48,50,52 is replaced by two sets of cams arranged to move the plates 30 towards and away from one another to effect flange heating and forming. As a further alternative, a hydraulic system may be used.

With suitable arrangement, the apparatus may be arranged to form flanges on container bodies 10 which are other than circular in section e.g. rectangular or oval.

In a cam-operated modification shown in FIGS. 6 to 9 a forming die 122 has a boss 123 surrounded by a ring 136 which co-operates with the boss 123 to provide the flange forming recess. The boss 123 is mounted on a stub shaft 223 by means of bolts 323. An annular heater coil 141 is held against the boss 123 by a backing piece 139 which is also mounted on the stub shaft 223.

Figure 6:
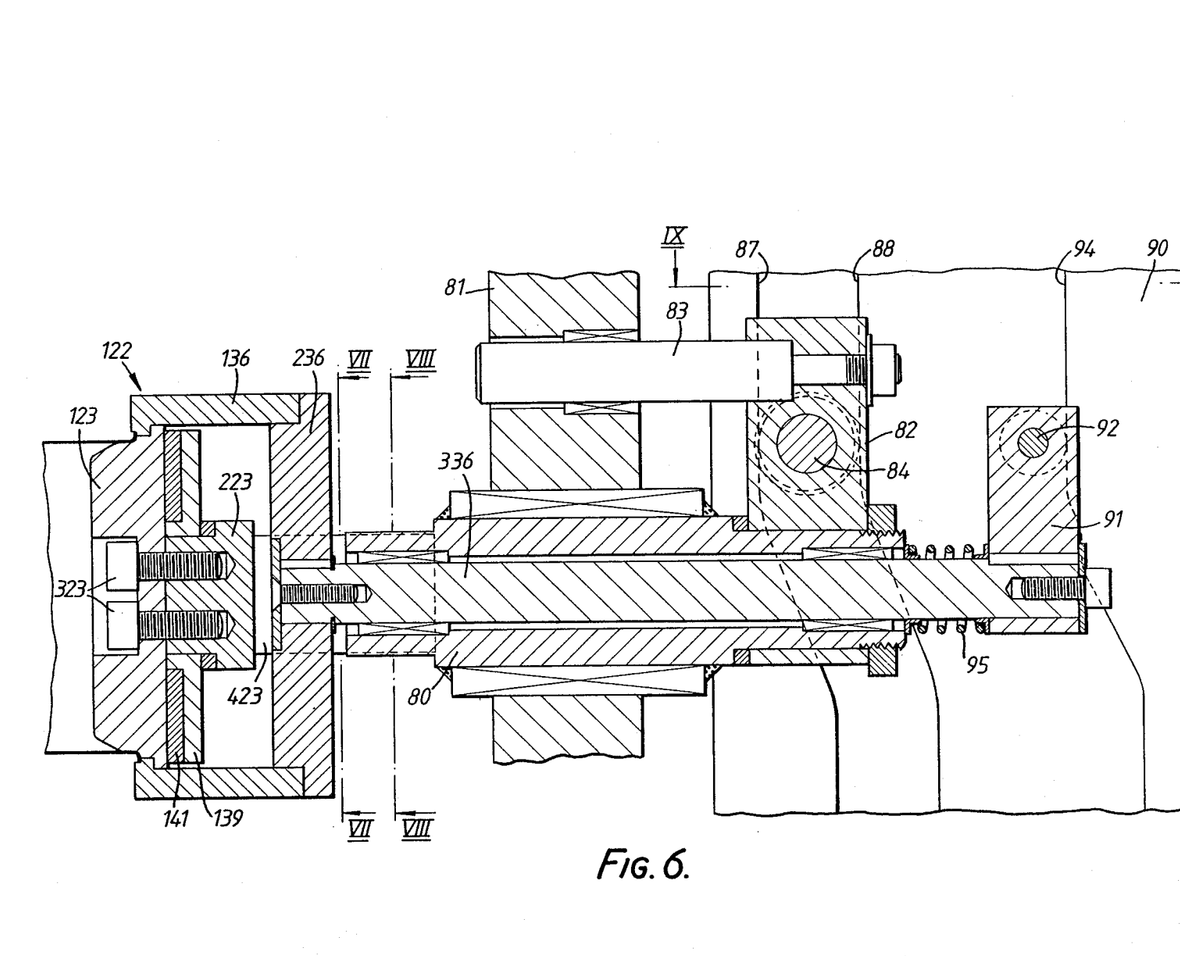
FIG. 6 is a longitudinal section through a flange forming tool of a modification of the apparatus.
Figure 7:
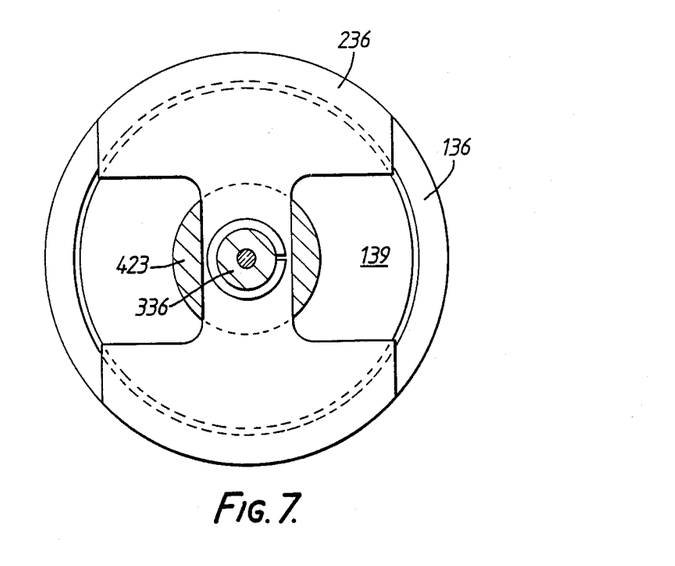
FIG. 7 is a section on the line VII—VII in FIG. 6.
Figure 8:
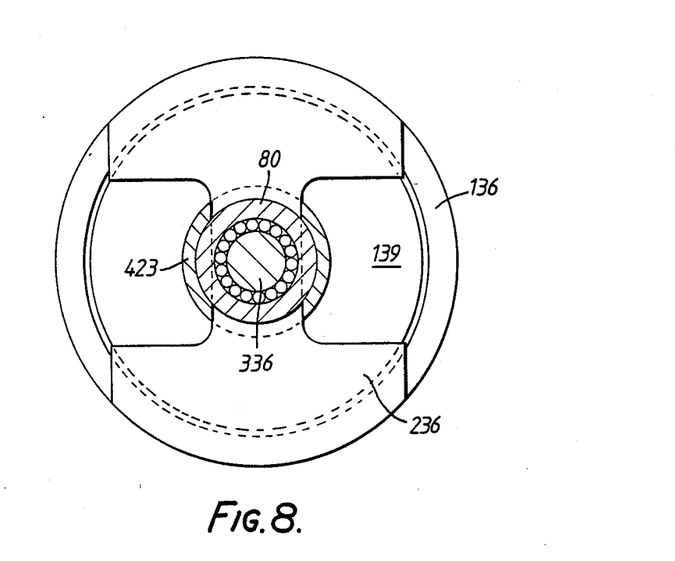
FIG. 8 is a section on the line VIII—VIII in FIG. 6.

The ring 136 is mounted on a back plate 236 which has a dumb-bell shape as shown in FIGS. 7 and 8 and is bolted and keyed onto the end of a shaft 336. The stub shaft 223 is split at its right hand end in FIG. 6 to provide two arms 423 each having, adjacent the stub shaft, a cross section in the form of a segment of a circle as shown best in FIG. 7. These arms 423 loosely straddle the central limb of the backing plate 236 and are longer than the thickness of the backing plate to allow limited relative axial movement between the backing plate 236 and the boss 123. It will be seen from FIG. 6 that movement of the boss 123 to the right relative to the backing plate 236 will enable the ring 136 to act as an ejector ring to eject the flanged body 10 from the forming die.

The ends of the arms 423 remote from the boss 123 are arcuate in section as shown in FIG. 8 and are rigidly connected, such as by glueing, to a reduced portion of a cylindrical sleeve 80 journalled for longitudinal movement in a support plate 81. The shaft 336 is journalled for longitudinal movement within the sleeve 80 and extends completely therethrough.

Figure 9:
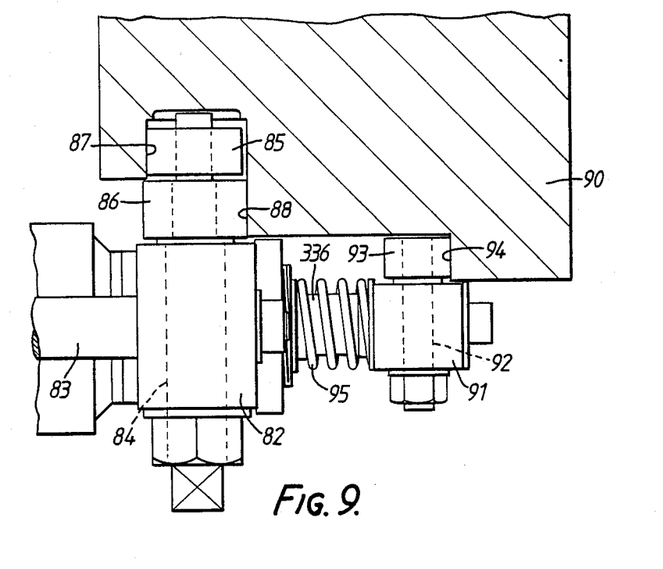
FIG. 9 is a section view on the line IX—IX in FIG. 6.

A block 82 mounted on the sleeve carries a guide shaft 83 which is journalled in a support plate 81 for axial sliding movement therethrough. The block 82 further carries a shaft 84 as best shown in FIG. 9. The shaft 84 carries two cam following rollers 85 and 86 while engage opposed cam surfaces 87 and 88 respectively, formed on the periphery of an annular cam which is driven (by means not shown) to oscillate about its axis through an arc of about 15°. In a similar manner, a block 91, fixed to the end of the shaft 336, carries a shaft 92. The shaft 92 carries a cam following roller 93 which engages a cam surface 94 on the oscillating cam 90.

A compression spring 95 surrounds the shaft 336 and acts between the sleeve 80 and the block 91 to urge the roller 93 into engagement with its associated cam surface 94.

In FIG. 6, the apparatus is shown in its forward position in which the container body 10 is flanged by the forming die 122. When the flange has been formed, the forming die is first retracted as a unit over a small distance such as 5 mm by movement of the cam 90 over say, 5°. At this point the profiles of the cam surfaces 87, 88, 94 are such that further movement of the cam over, say, a further 5° causes the sleeve 80 and thus the boss 123 to retract further, say by another 10 mm, whilst the shaft 336, the backing plate 236, and the ring 136 are kept stationary. As will be understood, it is during this part of the operation that the ring 136 will act to eject the container body from the forming die as the backing plate 236 slides within the arms 423 of the stub shaft 223. Further movement of the cam 90 over a final arc of, say, 5° causes a small further movement of the sleeve 80 and shaft 336 together to achieve the fully retracted position of the forming die. The boss 123 is re-engaged with the ring 126 on the subsequent reverse movement of the cam 90 to advance the forming die for its next forming operation. With reference to FIG. 9, it will be seen that retraction of the sleeve 80 and associated components is effected by means of the action of cam surface 87 on roller 85 whilst advance of the sleeve is effected by means of the action of cam surface 88 on roller 86.

I claim:

1. Apparatus for flanging tubular articles of a thermoplastic polymer which has been drawn and heat-set to an elevated temperature comprising:
   (a) a heating die shaped to receive an end of one of the tubular articles and to restrain said end from shrinkage, said heating die being a heated body with an annular recess dimensioned to receive the end of the tubular article,
   (b) means for maintaining the heating die at a temperature at which the thermoplastic polymer is softened, said softening temperature being above the glass transition temperature of the polymer but below the elevated temperature to which it has been heat-set;
   (c) means for applying an end of one of the tubular articles to the heating die so that said end is softened while restrained from residual shrinkage by the heating die;
   (d) a forming die shaped to form an outward flange on said end of the tubular article, said forming die being a heated body with a boss running into an outward flange for forming the outwardly directed flange on the tubular article,
   (e) means for holding the forming die at a forming temperature below the softening temperature;
   (f) means for transferring the tubular article from the heating die to the forming die;
   (g) means for forcing the forming die and the heat-softened end of the tubular article together to form said outward flange;
   (h) means for cooling the flanged end of the tubular article while said flange is being set, said cooling means being located externally of the tubular article.

2. Apparatus according to claim 1, wherein the means for cooling the flanged end comprises means for directing cooling air to the flange.

3. Apparatus according to claim 1, wherein the means for transferring the tubular article from the heating die to the forming die comprises a rotary member having a gripping means for gripping the tubular article, and indexing means for rotating the rotary member between positions in which it presents the tubular article to the heating die and to the forming die, respectively.

4. Apparatus according to claim 3, wherein the gripping means comprises a bore in the rotary member and means for applying suction to the bore.

5. Apparatus according to claim 1, wherein the heating die and the forming die are mounted on a common support member movable in a direction parallel to the axes of the dies, and the means for applying an end of the tubular article to the heating die and the means for forcing the forming die and the heat-softened end of the tubular article together are constituted by a fluid pressure actuator arranged to move the support member in said direction.

6. Apparatus according to claim 5, adapted to flange both ends of a tubular article simultaneously, wherein pairs of opposed heating dies and forming dies are disposed on opposed supporting members each of which has a fluid pressure actuator to move it towards and away from the opposite support member.

7. Apparatus according to claim 1, wherein the forming die boss and ring are supported to allow limited relative axial movement between them such that on retraction of the forming die relative axial movement between the boss and the ring causes the ring to eject the flanged end of the tubular article from the forming die.

8. Apparatus according to claim 7, wherein axial movement of the boss and ring of the forming die is controlled by an oscillating cam and is transmitted to the boss and the ring by cam following rollers connected to the boss and the ring respectively and mounted to engage cam surfaces provided on the oscillating cam.

9. Apparatus according to claim 8, wherein the boss is mounted on a stub shaft which has two axial extending arms connected at their ends remote from the boss to a cylindrical sleeve mounted for axial movement in the apparatus and wherein the ring is carried on a backing plate shaped to pass between the arms of the stub shaft and mounted on the end of a shaft journalled within the sleeve and extending at either end therefrom.

10. Apparatus according to claim 9, wherein a block mounted on the sleeve carries first and second cam following rollers which engage respective first and second cam surfaces on the oscillating cam to effect advance and retraction of the sleeve and components fixed therewith.

11. Apparatus according to claim 10 wherein a second block mounted on the shaft carries a third cam following roller which engages a third cam surface on the oscillating cam to effect advance and retraction of the shaft and components fixed therewith; the third cam following roller being biassed into engagement with the third cam surface by means of a spring surrounding the shaft and acting between the sleeve and the second block.

12. Apparatus according to claim 1 wherein said heating die annular recess is a space defined by a wall and a surrounding ring.

13. Apparatus according to claim 1 wherein said forming die boss and flange define an annular recess in conjunction with a surrounding ring.

14. Apparatus according to claim 1 wherein said heating die annular recess is a space defined by a wall and a surrounding ring and said forming die boss and flange define an annular recess in conjunction with a surrounding ring.

* * * * *